United States Patent
Arroyo et al.

(10) Patent No.: US 7,188,347 B2
(45) Date of Patent: Mar. 6, 2007

(54) METHOD, APPARATUS AND SYSTEM FOR CONNECTING SYSTEM-LEVEL FUNCTIONALITY OF DOMESTIC OS OF A MOBILE PHONE TO ANY APPLICATION OPERATING SYSTEM

(75) Inventors: Daniel Arroyo, Helsinki (FI); Mia Veijola, Muijala (FI)

(73) Assignee: Nokia Corporation, Espoo (FI)

( * ) Notice: Subject to any disclaimer, the term of this patent is extended or adjusted under 35 U.S.C. 154(b) by 698 days.

(21) Appl. No.: 10/156,752

(22) Filed: May 24, 2002

(65) Prior Publication Data
US 2003/0221024 A1    Nov. 27, 2003

(51) Int. Cl.
*G06F 13/00* (2006.01)
(52) U.S. Cl. ..................................... 719/319
(58) Field of Classification Search ............... 719/319, 719/310
See application file for complete search history.

(56) References Cited

U.S. PATENT DOCUMENTS

| | | | |
|---|---|---|---|
| 5,627,996 A | | 5/1997 | Bauer |
| 5,790,837 A | * | 8/1998 | Weir et al. .............. 703/25 |
| 5,887,198 A | | 3/1999 | Houlberg et al. |
| 5,935,228 A | | 8/1999 | Shinomura |
| 6,269,409 B1 | * | 7/2001 | Solomon ............... 719/329 |
| 6,334,157 B1 | * | 12/2001 | Oppermann et al. ........ 719/310 |

OTHER PUBLICATIONS http:/www.forum.nokia.com/main/1,35452,1_48,00.html Symbian (2 pages); Into to Symbian.
http://www.nokia.com/phones/7650/index.html; The Nokia 7650 at a Glance (1 page).
http://www.nokia.com/phones/7650/demo/index.html Nokia 7650 (Flash Demo).
http://www.nokia.com/phones/7650/main_feat.html Nokia 7650 Main Features (2 pages).
http://www.nokia.com/phones/7650/specifications.html Nokia 7650 Full Specifications (2 pages).
http://www.nokia.com/java/index.html Java Technology (1 page).
http://www.nokia.com/java/what_is_java.html What is Java? (1 page).
http://www.nokia.com/java/benefits.html Benefits (1 page).
http://www.nokia.com/java/for_developers.html; For Application Developers; Creating Tasty Blends (1 page).
http:www.nokia.com/java/for_users.html; For Phone Users Enjoy Instantly. . . or Fake Away (1 page).
http://www.symbian.com/books/psp/psp-info.html; Symbian OS Technology; Professional Symbian Programming: Mobile Solutions on the EPOC.
Platform (1 page); ppc/ppc-info.html; Programming Psion Computers (1 page).

(Continued)

*Primary Examiner*—William Thomson
*Assistant Examiner*—LeChi Truong

(57) ABSTRACT

A system level functionality of a domestic operating system (DOS) of a mobile terminal is connected to any application operating system by means of a DOS server that interfaces to various domestic operating systems with DOS-specific plug-ins. The DOS server interfaces to the application layer directly via a client interface.

13 Claims, 3 Drawing Sheets

OTHER PUBLICATIONS

"Symbian OS Technology; Symbian Press Books" Published on Internet http://www.symbian.com/books/index.html; socp/socp-info.html; wjsd/wjsd-info.html (3 pages).

"Symbian OS Technology; Programming for the Series 60 Platform and Symbian OS" (3 pages), Table of Contents Published on Internet http://www.symbian.com/books/s60p/s60p-info.html; s60p-TOC.html.

"Symbian: About Us: Overview" http://www.symbian.com//technology/technology.html; news/2001/nokia7650-feat.html; Published on Internet http://www.symbian.com/about/about.html; vision.html; symb-os.html; history.html; biographies.html; ownership.html; careers/careers.html; index.html (17).

"Symbian OS Technology; Symbian OS Version 6.x; Detailed Operating System Overview", D. Mery, Rev. 1.2, Oct. 2001 Published on Internet http://www.symbian.com/technology/symbos-v6x-det.html (19pp).

"Symbian OS Technology: Symbian OS Version 7; Functional Description"., D. Mery, Rev. 1.1, Mar. 2002 (21 pages) Published on Internet http://www.symbian.com/technology/symbos-v7x-det.html.

"Symbian OS Technology; Symbian OS User Interfaces" Published on Internet (2 pages) http://www.symbian.com/technology/devices.html.

"Symbian Magpie Technology; Addressing the Problem of Dynamic Data Services Delivery to Mobile Phones" Published on Internet (pp. 1-7) http://www.symbian.com/technology/magpie.html.

"Symbian OS Technology: Open Symbian OS Phones", Published on Internet (2 pages) http://www.symbian.com/technology/symbos-phones.html.

"The Symbian Platform", Nokia Mobile Phones, 2000; 8 pages.

"Symbian OS Version 6.x Overview", Published on Internet (5 pages) http://www.symbian.com/technology/symbos-v6x.html.

"Symbian OS Technology: Why is a Different Operating System Needed?", D. Mery, Rev. 2.1, Mar. 2002 (6 pages) Published on Internet http://www.symbian.com/technology/why-diff-os.html.

"Symbian OS Technology" Symbian OS"Supporting Packet-Switched Networks", GovCross, Rev. 1.05 Oct. 2001 Published on the Internet: http://www.symbian.com/technology/packet-switch.html (2 pages).

"Symbian OS Technology: Wireless Java for Symbian Devices", Published on Internet May 1, 2002; Table of Contents and Introduction (13 pages altogether) http://www.symbian.com/books/wjsd/wjsd-TOC.html.

"Symbian OS Technology: Creating Symbian OS Phones" P. Sanders, Rev. 1.1, Apr. 2002, published on Interent (7 pages) http://www.symbian.com/technology/create-symb-os-phones.html.

"Creating the Mass-Market for Symbian OS", D. Wood et al, Rev. 1.05 Oct. 2001, published on Internet (5 pages) http://www.symbian.com/technology/mass-market.html.

* cited by examiner

METHOD, APPARATUS AND SYSTEM FOR CONNECTING SYSTEM-LEVEL FUNCTIONALITY OF DOMESTIC OS OF A MOBILE PHONE TO ANY APPLICATION OPERATING SYSTEM

BACKGROUND OF THE INVENTION

1. Technical Field

The present invention relates to interfacing an application operating system to an operating system native to a mobile terminal for operating lower-layer processes.

2. Discussion of Related Art

The Assignee's proprietary Series 60 Platform version 1.0 is designed to provide manufacturers with a complete smart phone reference design, including a host of wireless applications. It contains a set of robust components that are intended to be re-used across those applications, including a configurable user interface, WAP browser, MMS client, SMS client, email client, short-range connectivity OBEX engine, PC-connectivity, bluetooth and IR stacks, PIM and telephony applications, and the necessary system services to ensure portability across platforms. It is a source code product that a customer can import and integrate to their different smart phone hardware designs.

The Series 60 Platform runs on the open-architecture Symbian Generic Technology which is a common core of Symbian APIs and operating system technology. It contains all the interfaces to user interface (UI) applications, dynamic link libraries, executables and device drivers for controlling the keyboard, display, RTC, Bluetooth, IrDA, and Flash file devices. The Symbian OS communicates with the device's core cellular software through a well-defined and documented messaging architecture. In case the Symbian operating system is delivered as part of the Series 60 Platform it need not be licensed separately from Symbian. A Symbian OS Generic Technology (GT) and Series 60 architecture diagram as shown in FIG. 1.

The Symbian OS GT is shown on top of manufacturer-specific hardware and lower-level software. The hardware will typically include a central processing unit, for instance a 32-bit CPU, running at relatively low speeds, such as 36 MHz or 190 MHz, although future chips are envisioned at higher speeds. The hardware will typically include a ROM having a domestic operating system including middleware and applications. The system will also include some RAM used by the system kernel and active programs for use much like a hard drive would be on a desktop. The total ROM might be on the order of tens of megabytes, while the RAM might be operable or somewhat less. Various input/output devices are also typically provided, such as a keyboard, card slots, dial-up, serial, infrared, IP slots, etc. Provision is made for batteries via external power.

It is known in the art that the Symbian platform uses an EPOC software architecture originally developed by Psion. The idea of Symbian is to set the standard for mobile wireless operating systems, and to enable a mass market for wireless information devices. The development of the core Symbian operating system design enables customer companies to license and build their own systems. The Symbian platform is open, i.e., any company is free to license the product by paying a fee to Symbian for each device that they sell that uses the Symbian platform. Symbian is co-owned by a number of interested companies. The EPOC programming system uses the C++ programming language. It includes power management built within the kernel, sophisticated memory management, event handling mechanisms, and effective multi-tasking. For efficient use of these facilities, a coherent set of APIs is provided in terms of native C++. In addition, the system is built to be adaptable for different CPUs and hardware configurations. This enables the integration of EPOC-based systems to multiple products (such as wireless information devices, hand-portable computers, and PCs). The Symbian platform is designed to be extendable, and software need only be developed once for it to work on any Symbian device with the same user interface (UI). For different UIs, some extra work is needed to optimize the application.

Open operating systems for mobile terminals, such as the Symbian Platform shown in FIG. 1, describe the interface to lower-layer functionalities, such as the GSM/Radio Modem Stack, but do not concern other things outside of it at all, such as start-up reasons, restore factory settings, and other special requests that any manufacturer would want to add. Current interfaces are based on MDA (plug-in module for media server for handling audios, codecs, etc.), CSY (plug-in for data), and TSY (plug-in for GSM messages (ETel)) interface that fulfil ETSI specifications but do not take into account lower-layer requirements.

In the Series 60 code, calls to the Domestic OS are presently placed everywhere in the code, based on the particular component's needs but are routed through the open-architecture of the Symbian OS.

DISCLOSURE OF INVENTION

According to a first aspect of the invention, a method for connecting system level functionality of a domestic operating system (DOS) of a mobile terminal to an application operating system comprises the steps of providing request signals to the DOS via a DOS specific extension module in response to request signals from a client interface, and providing reply signals to the client interface in response to reply signals received from the DOS via the DOS specific extension module.

According to a second aspect of the invention, a method for connecting a domestic operating system (DOS) of a mobile terminal to an application operating system is characterized by connecting system level functionality of said DOS to the application operating system by providing request signals to the DOS via a DOS specific extension module in response to request signals from a client interface, and by providing reply signals to the client interface in response to reply signals received from the DOS via the DOS specific extension module.

Further according to the second aspect of the invention, notification signals are received from the DOS via the DOS specific extension module and selectively provided the event notification signals to the client interface in response to registration signals previously received from client interface registering for event notifications.

Still further according to the second aspect of the invention, an unregistration signal is provided from the client interface to the DOS relating to an event for which a registration signal was previously provided.

According to a third aspect of the invention, a device for connecting a domestic operating system (DOS) of a mobile terminal to an application operating system, comprises a client interface for providing request signals from applications for requesting services, for providing registration signals for registering for events and for receiving event notification signals and reply signals, a DOS server responsive to the request signals, for providing the request signals over a customer interface, the DOS server responsive to the registration signals and to the event notification signals over a protocol interface of the DOS for providing the event notification signals to the client interface, the DOS server responsive to reply signals for providing the reply signals to the client interface, and a DOS-specific extension module responsive to the request signals, for providing the request signals over a protocol interface to the DOS and for receiving the reply signals over the protocol interface for providing the reply signals to the DOS server, and responsive to the event notification signals received over the protocol interface for providing the event notification signals to the DOS server.

According to a fourth aspect of the invention, a device comprises a client interface for providing request signals from applications for requesting services, a domestic operating system server, responsive to the request signals, for providing the request signals over a customer interface to a domestic operating system of a mobile device, and a DOS-specific extension module, responsive to the request signals from the DOS server, for providing the request signals over a protocol interface to the DOS and for receiving reply signals over the protocol interface from the DOS for providing the reply signals to the DOS server, wherein the DOS server provides the reply signals to the client interface.

Further according to the fourth aspect of the invention, the client interface also provides registration signals for registering for events, and the DOS server includes an event manager, responsive to the registration signals for providing event notification signals to the client interface upon receiving event notifications from the domestic OS for which clients have registered.

These and other objects, features and advantages of the present invention will become more apparent in light of the following detailed description of a best mode embodiment thereof, as illustrated in the accompanying drawing.

BEST MODE FOR CARRYING OUT THE INVENTION

Figure 2:
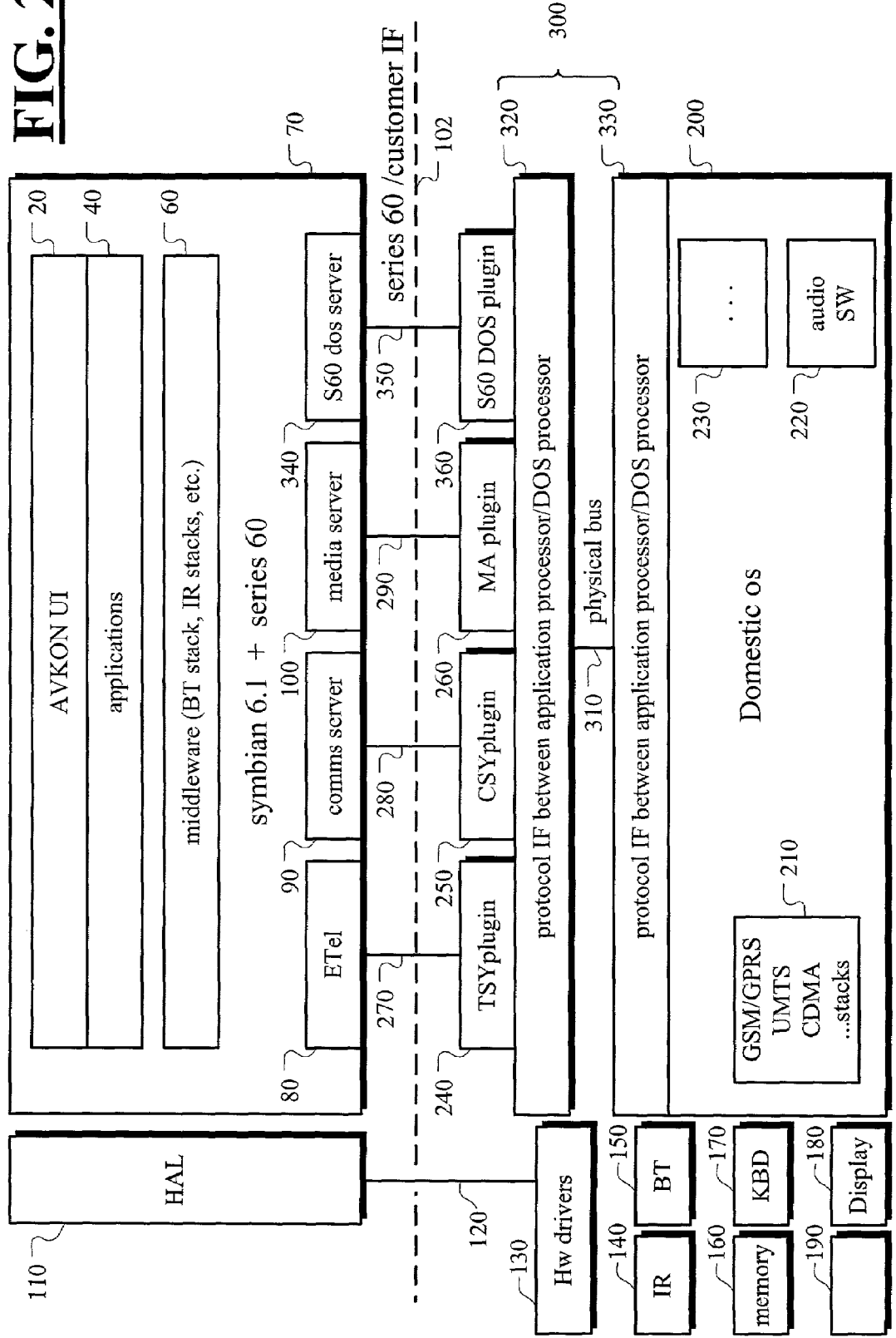
FIG. 2 shows assignee's proprietary platform combined with an open architecture platform together interfacing to a domestic operating system (DOS) for operating underlying manufacturer-specific hardware, according to the present invention.

As shown in FIG. 2, the Symbian 6.1+Series 60 combination includes an AVKON UI 20 comprising a user interface having the look and feel of Series 60. This is an intuitive user interface mandating a color screen with a resolution of 176×208 pixels, two soft keys, and four-way navigation, among other elements.

Also included are smart phone telephony applications 40, provided as part of the 1.0 version of the product: personal information management (PIM), synchronization (SyncML), GSM telephony applications, and application installation and management.

At a lower layer is a middleware component 60 which includes a bluetooth stack, infrared stacks, etc. The Symbian 6.1+Series 60 platform 70 also includes a number of APIs at a series 60/customer interface 102. These include an ETel API 80 for GSM messages, a communications server API 90 for data, and a media server API 100 for handling audios, codecs, etc. The Symbian 6.1 GT plus series 60 platform 70 is also associated with a HAL 110 device which provides a Hardware Abstraction Layer. This is Symbian's way of controlling common PDA interaction with hardware such as BackLight control. The HAL device 110 is connected across the series 60/customer interface 10 by a line 120 to hardware drivers 130 on the manufacturer's specific hardware side.102 These include infrared 140, bluetooth 150, memory 160, keyboard 170, display 180, and other unspecified devices 190.

The customer side also includes a Domestic OS (DOS) 200 that includes various protocol stacks 210 which may include for instance GSM/GPRS, UMTS, CDMA, etc. Also included are other software modules for instance audio software 220 and other customer specific modules 230 which may vary from customer to customer. The DOS 200 is the OS that Series 60 licensees have that controls the phone functionality, and particularly the GSM/GPRS, etc. stack. It comprises a real-time OS, and the combined Symbian and Series 60 platform use services from the DOS.

In order to interface with the Symbian 6.1+series 60 APIs 80, 90, 100, corresponding plug-ins 240, 250, 260 are provided. Each of these plug-ins has a predefined interface 270, 280, 290 to their respective APIs 80, 90, 100. In other words, the ETel API 80 has a standardized interface 270 to the TSY plug-in 240. The communication server API 90 has a standardized interface 280 to the CSY plug-in 250. Likewise, the media server 100 has a standardized interface 290 to the MDA plug-in 260. The TSY plug-in 240, CSY plug-in 250, and MDA plug-in 260 are custom-made for the particular domestic OS 200 with which it must interface. The actual interface of the plug-ins to the domestic OS is carried out by means of a protocol interface 300 which comprises a physical bus 310 interconnecting protocol interfaces 320, 330 between the plug-ins and the domestic OS.

Figure 1:
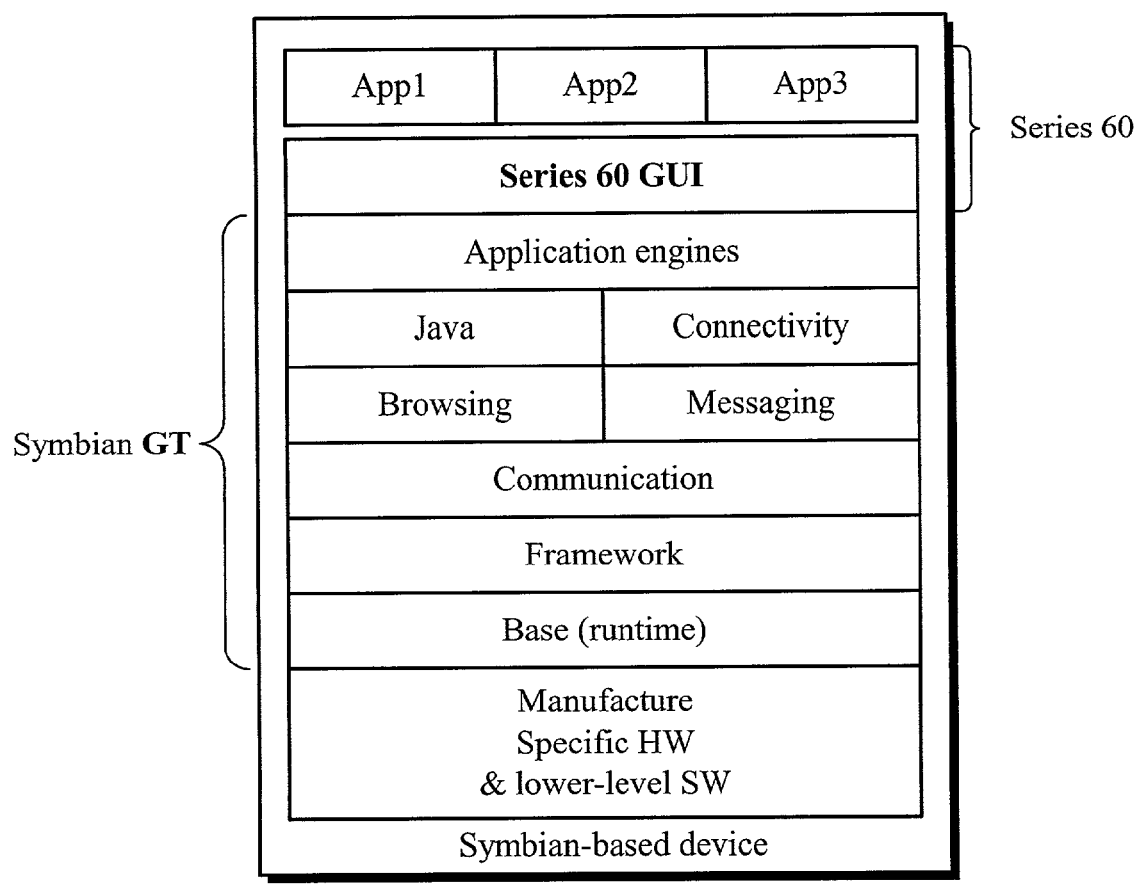
FIG. 1 shows an open architecture operating system between a proprietary application layer platform such as assignee's Series 60 platform and a manufacturer-specific hardware at a lower layer.

According to the present invention, a new Series 60 domestic OS server 340 is provided on the Symbian/Series 60 platform side of the customer interface 10. It is in parallel with the APIs 80, 90, 100 in the combined Symbian 6.1 GT plus series 60 platform 70 but the idea is to provide services that are not provided by Symbian's ETEL (Telephony Server) C32 (Communications Server) or MDA (Media Server). It adds more functionality that can be asked from the Domestic OS. It provides for access to certain mobile phone system functionalities that can advantageously be applied when making a commercial product of a mobile phone that holds both application and modem functionalities in different operating systems. This API 340 makes it possible to easily apply any manufacturer's own features to the application programming interface that is used. Although it is shown used in a series 60 platform to apply to any customer's own GSM/GPRS/UMTS/CDMA stack at a system level, it should be realized that the invention makes it possible to apply any manufacture's own features easily to any application programming interface that is used. The invention provides a generic system requirement mapper from the phone manufacturer's domestic operating system to any application layer running on an open OS such as Symbian/series 60 used in FIG. 1.

An interface 350 connects the API 340 to a DOS plug-in 360 which is custom-made for the particular manufacturer's domestic OS 200.

Figure 3:
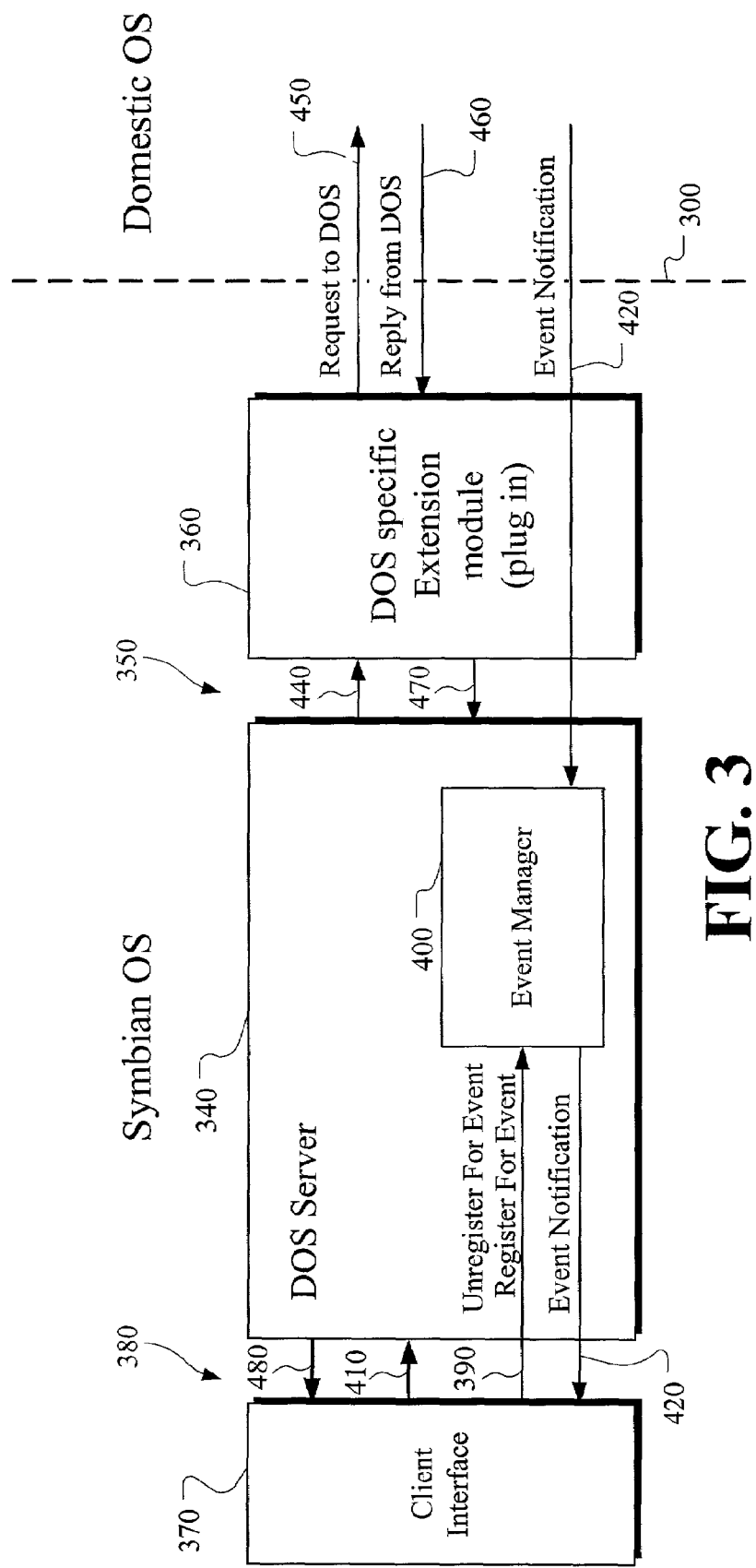
FIG. 3 shows more details of the DOS server interfacing to a DOS plug-in and client interface, according to the present invention.

FIG. 3 shows more details of the present invention including the series 60 Domestic OS server 340 connected over the interface 350 to the DOS plug-in 360 which is characterized in FIG. 3 as a DOS specific extension module. Also shown in FIG. 3 is a client interface 370 that provides Symbian applications with a set of functions to request services for any domestic OS. The client interface 370 has a set of classes that allow Symbian applications to establish a session with the DOS server and make request to it. It communicates with the server by using Symbian's client-server standard communication. Clients can also register for events by using this interface. Thus, the Symbian applications are provided with the possibility of registering themselves over an interface 380 to the DOS server so as to be informed about a list of predefined events coming from the Domestic OS side. An example of an event is, for instance, a change in field strength. The Domestic OS reports a change in the radio network strength, and Symbian has to repaint the network strength bars on the display. Other events that would be notified might, for instance, include a change in battery level that would require a change in battery bar display or to indicate whether a GPRS (packet-switched) connection was active or not. Registration/unregistration for an event is shown by a signal on a line 390 from the client interface 370 to an event manager 400 within the DOS server 340. The DOS server 340 uses the Symbian client-server interface 380 to collect all the requests such as shown on a line 410 from every application in the system and route them to the Domestic Operating System 200 on the manufacturer's side. Examples of function calls would be, for instance, a request for SIM card default language. In that case, Symbian OS asks Domestic OS to look into the SIM card for the default language by using the DOS server. Another example would be to handle a restore factory settings request. Symbian OS will inform the Domestic OS that it has to do a restore factory settings operation. Thus, the DOS server handles the sessions established by several clients and routes them to the extension module that fulfils them. The event manager 400 collects all the clients wishing to listen to events and distributes the event when it arrives as shown for instance on a line 420. It may also be configured to drop events if it determines that nobody is listening for them in order to optimize performance by not executing more code than necessary if no client is listening for a particular event. An event may be unregistered for by a client by sending an unregistration signal on the line 390. Thus the event manager 400 of the DOS server 340 contains a list of events that have clients listening, and it is responsible for informing those clients when an event occurs.

The DOS specific extension module (plug-in) 360 defines an abstract interface to be implemented for every different domestic OS. The plug-in 360 implements a set of pure virtual C++ methods that will be called as part of client requests by the DOS server. The implementation should communicate with the Domestic OS and fulfils the request by using the parameters provided by the functions. Every licensee is responsible for implementing the extension module 360 for its own Domestic OS. Consequently, it is phone-manufacturer specific, as mentioned above. As mentioned above, the DOS is the OS that the Series 60 licensees have in order to control the phone functionality and the, for instance, GSM stack. It is a real-time OS, and Symbian and Series 60 use services from it. In Assignee's case, that OS is called the NOS (Nokia Operating System).

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

The invention claimed is:

1. Method, comprising:
   connecting system level functionality of a domestic operating system of a mobile terminal to an application operating system by:
   providing request signals to said domestic operating system via a DOS specific extension module and via a domestic operating system server in response to request signals from a client interface, and providing registration signals for registering for events to said domestic operating system server,
   providing reply signals to said client interface in response to reply signals received from said domestic operating system via said DOS specific extension module and via said domestic operating system server, and
   receiving event notification signals by said domestic operating system server from said domestic operating system via said DOS specific extension module and providing said event notification signals to said client interface by said domestic operating system server.

2. The method of claim 1, comprising: receiving event notification signals from said domestic operating system via said domestic operating system specific extension module and selectively providing said event notification signals to said client interface in response to registration signals previously received from said client interface registering for event notifications.

3. The method of claim 1, comprising: providing an unregistration signal from said client interface to said domestic operating system relating to of an event for which a registration signal was previously provided.

4. Method for connecting a domestic operating system of a mobile terminal to an application operating system, comprising: connecting system level functionality of said domestic operating system to said application operating system by providing request signals to said domestic operating system via a DOS specific extension module and via a domestic operating system server in response to request signals from a client interface, by providing registration signals for registering for events to said domestic operating system server, by providing reply signals to said client interface in response to reply signals received from said domestic operating system via said DOS specific extension module and via said domestic operating system server, and by receiving event notification signals by said domestic operating system server from said domestic operating system via said DOS specific extension module and providing said event notification signals to said client interface by said domestic operating system server.

5. The method of claim 4, comprising receiving said event notification signals from said domestic operating system via said DOS specific extension module and selectively providing said event notification signals to said client interface in response to registration signals previously received from said client interface registering for event notifications.

6. The method of claim 4, comprising providing an unregistration signal from said client interface to said domestic operating system relating to of an event for which a registration signal was previously provided.

7. Device for connecting a domestic operating system of a mobile terminal to an application operating system, comprising:
   a client interface for providing request signals from applications for requesting services, for providing registration signals for registering for events and for receiving event notification signals and reply signals;

DOS server, responsive to said request signals, for providing said request signals over a customer interface, said DOS server responsive to said registration signals and to said event notification signals over a protocol interface of said domestic operating system for providing said event notification signals to said client interface, said DOS server responsive to reply signals for providing said reply signals to said client interface; and a DOS-specific extension module, responsive to said request signals, for providing said request signals over a protocol interface to said domestic operating system and for receiving said reply signals over said protocol interface for providing said reply signals to said DOS server, and responsive to said event notification signals received over said protocol interface for providing said event notification signals to said DOS server.

8. A device, comprising:

a client interface for providing request signals from applications for requesting services, for providing registration signals for registering for events and for receiving event notification signals;

a domestic operating system server, responsive to said request signals, for providing said event notification signals to said client interface, for providing said request signals over a customer interface, to a domestic operating system of a mobile device; and a DOS-specific extension module, responsive to said request signals from said DOS server, for providing said request signals over a protocol interface to said domestic operating system, responsive to said event notification signals received over said protocol interface for providing said event notification signals to said DOS server, and for receiving reply signals over said protocol interface from said domestic operating system for providing said reply signals to said DOS server, wherein said DOS server is configured to provide said reply signals to said client interface.

9. The device of claim 8, wherein said client interface is configured to provide registration signals for registering for events and wherein said DOS server includes an event manager, responsive to said registration signals for providing said event notification signals to said client interface upon receiving event notifications from said domestic OS for which clients have registered.

10. Computer program with a program code for carrying out the steps of the method according to claim 1 when said computer program is run in processing means.

11. Computer program product with a program code, which program code is stored on a machine readable medium, for carrying out the steps of the method according to claim 1 when said computer program is run in processing means.

12. A device, comprising:

interface means, for providing request signals from applications for requesting services, for providing registration signals for registering for events and for receiving event notification signals;

server means, responsive to said request signals, for providing said event notification signals to said interface means, for providing said request signals over a customer interface, to a domestic operating system of a mobile device; and DOS extension means, responsive to said request signals from said server means, for providing said request signals over a protocol interface to said domestic operating system, responsive to said event notification signals received over said protocol interface for providing said event notification signals to said server means, and for receiving reply signals over said protocol interface from said domestic operating system for providing said reply signals to said server means, wherein said server means is configured to provide said reply signals to said interface means.

13. The device of claim 12, wherein said server means is a domestic operating system server.

* * * * *